United States Patent [19]

Weissenbach

[11] 3,977,379
[45] Aug. 31, 1976

[54] CONTAINED VOLATILE LIQUIDS VAPOR RETENTION SYSTEM

[76] Inventor: Joseph Weissenbach, 373 S. Hoover St., Los Angeles, Calif. 90020

[22] Filed: Aug. 13, 1973

[21] Appl. No.: 387,958

Related U.S. Application Data

[63] Continuation-in-part of Ser. No. 104,079, Jan. 5, 1971, Pat. No. 3,752,355.

[52] U.S. Cl. ................................................ 123/136
[51] Int. Cl.² ...................... F92M 17/34; B65J 3/00
[58] Field of Search ............... 123/136 R; 220/85 R, 220/85 VR, 85 VS, 86 R, 86 A; 261/22, 72 R

[56] References Cited
UNITED STATES PATENTS

| | | | |
|---|---|---|---|
| 3,617,034 | 11/1971 | Skinner | 220/85 VS |
| 3,678,912 | 7/1972 | Hensler | 123/136 |
| 3,752,355 | 8/1973 | Weissenbach | 220/86 R |

Primary Examiner—Wendell E. Burns

[57] ABSTRACT

A combustion engine system has a tank for volatile fuel with a flexible bag inside equipped with its own breather valve separate from the fill pipe for the tank. When the tank is filled, a muff around the full pipe seals the tank against exhaust of volatile vapors, and air from the bag is forced out the breather valve as it is displaced by the liquid fuel until a valve element on the bag shuts off the breather valve, whereby only pure air is vented to the atmosphere. As the tank empties during use, air returns through the breather valve to fill the bag and replace the space in the tank previously occupied by the liquid fuel. A separate valve controlled relief line communicates between the chamber in the tank and a solenoid controlled throttle valve passage so that when the passage is closed by the throttle valve hot soak vapors from the combustion engine are returned to the fuel tank.

7 Claims, 10 Drawing Figures

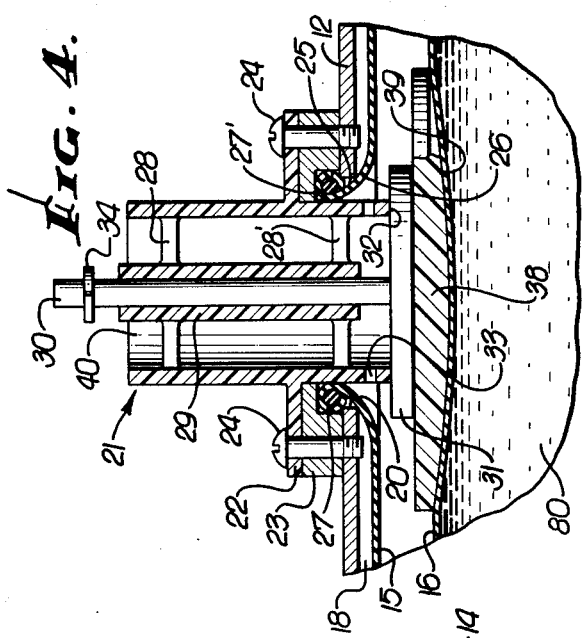
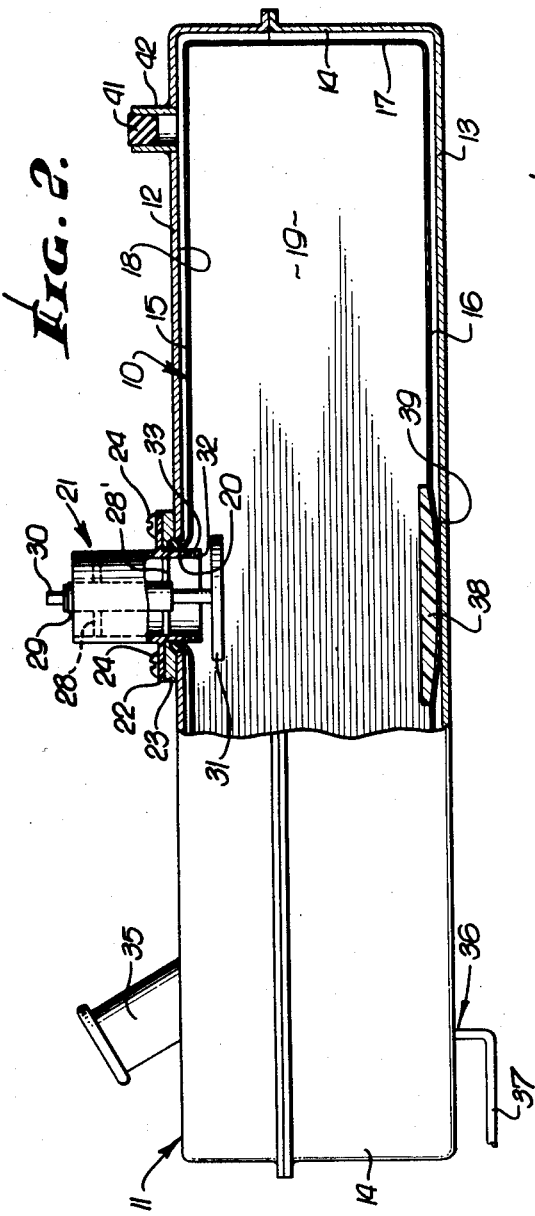
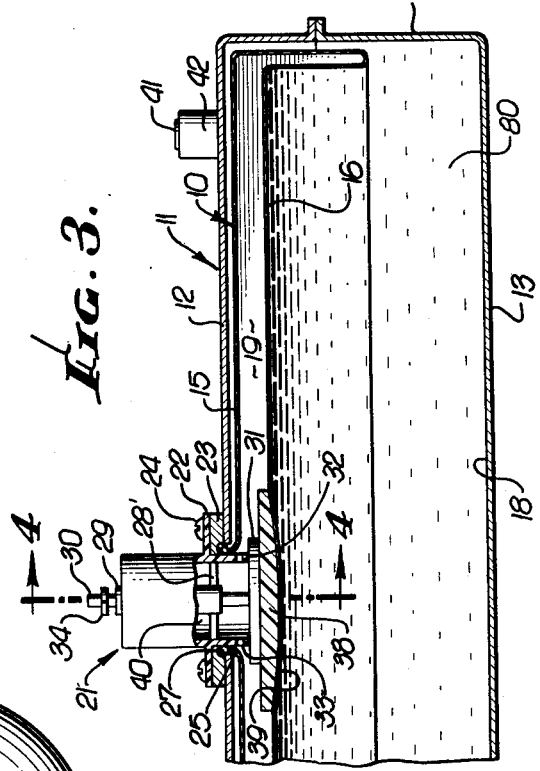
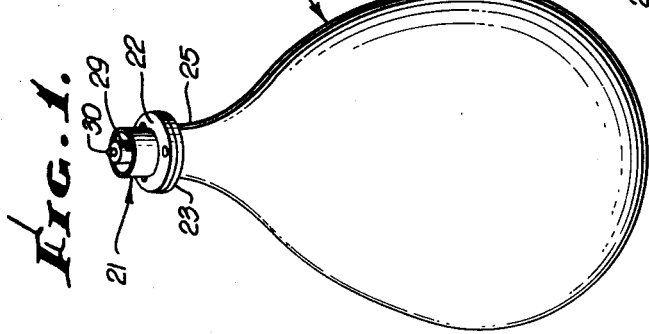

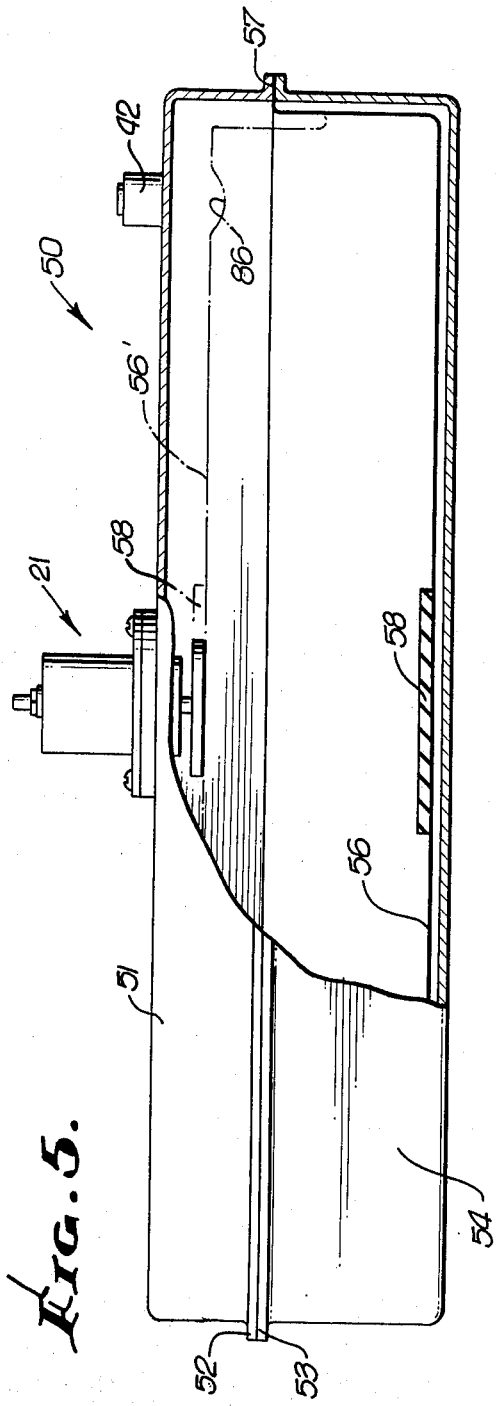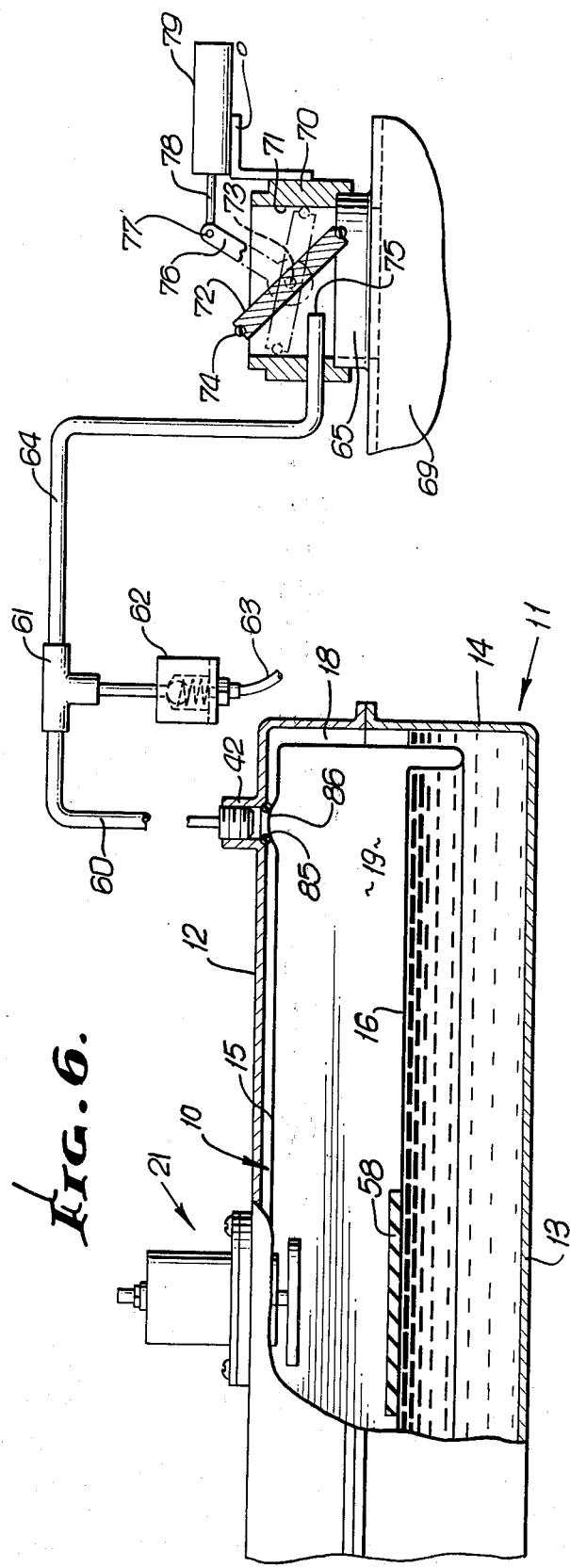

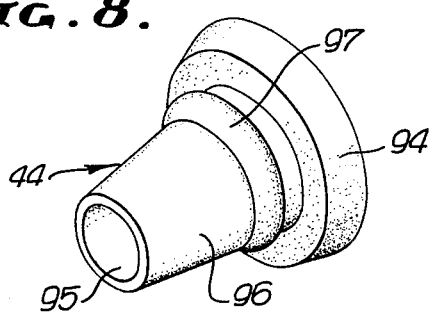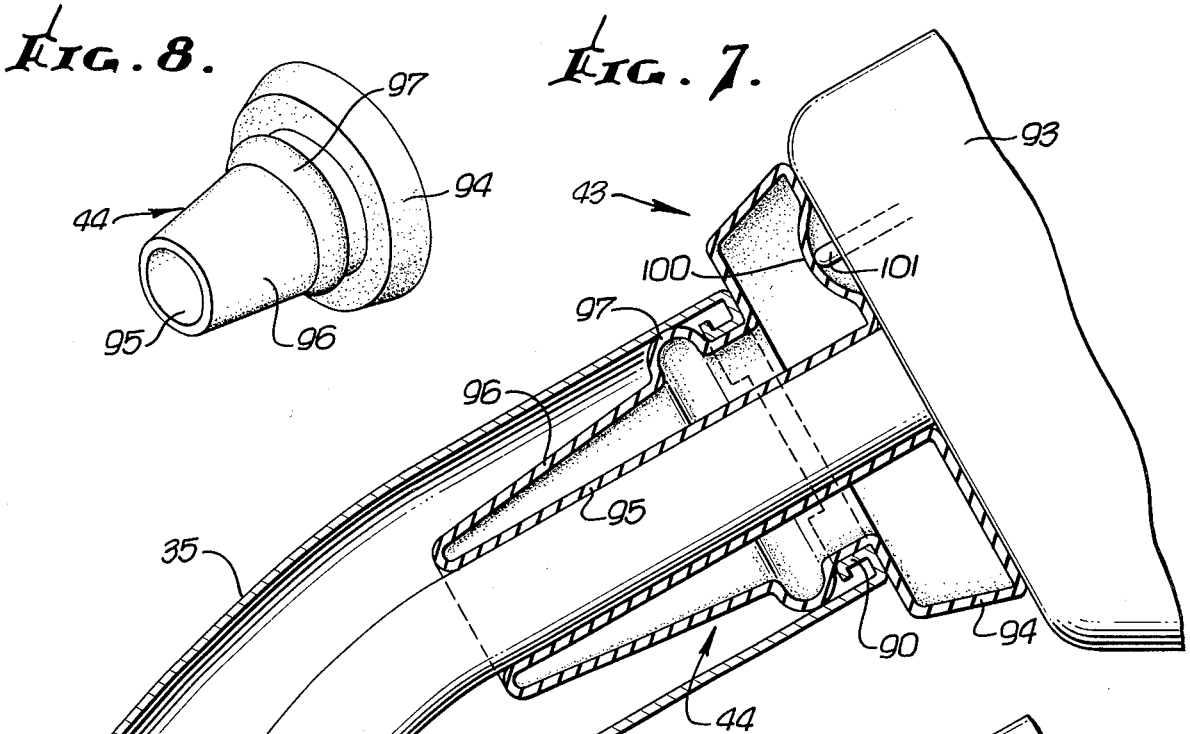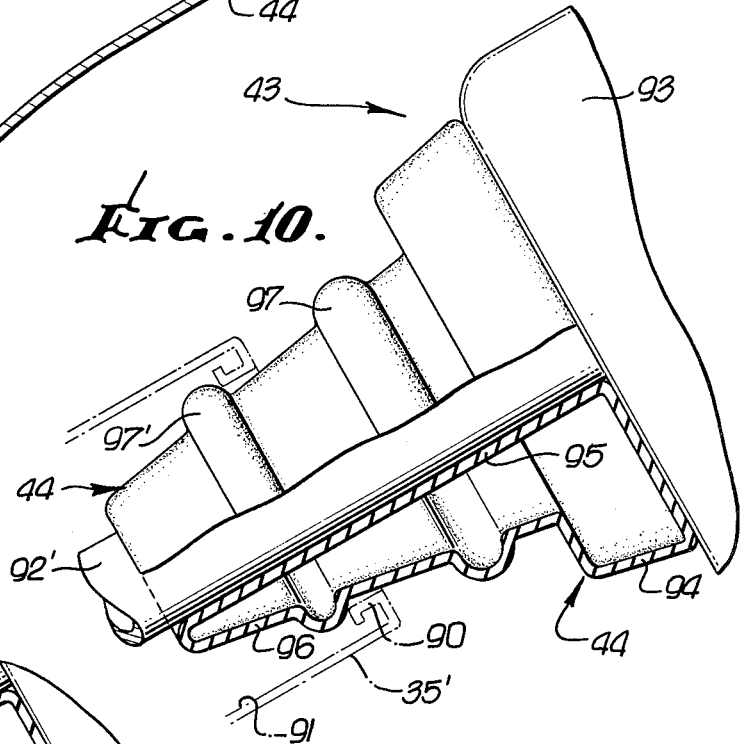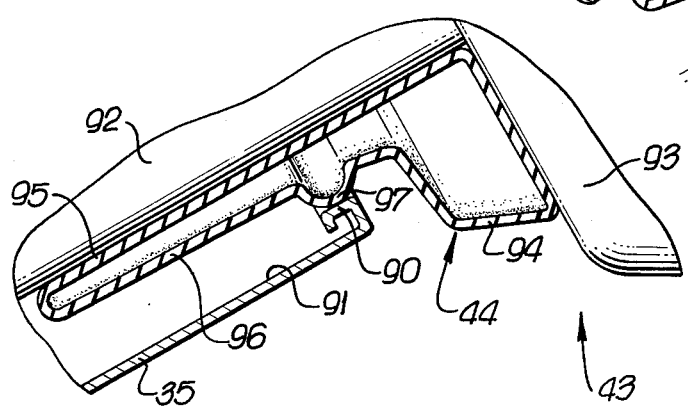

CONTAINED VOLATILE LIQUIDS VAPOR RETENTION SYSTEM

This is a continuation-in-part of copending application Ser. No. 104,079, filed Jan. 5, 1971 now U.S. Pat. No. 3,752,355 of Aug. 14, 1973.

There is in the prior art an assortment of structures showing one flexible container or another housed within a tank of some kind directed to the solution of various problems. Reference is made to prior patents in this general field of activity, namely:

| | | | |
|---|---|---|---|
| 1,977,862 | Scholtes | 2,611,512 | Fashay |
| 2,111,839 | Chenicek | 2,758,747 | Stevens |
| 2,387,598 | Mercier | 2,798,639 | Urban |
| 2,542,929 | Kimball | 3,477,610 | Hansen |

Sundry deficiencies are present in the patents identified above which makes them unsuitable for eliminating objectionable gases resulting from filling and emptying storage tanks for such materials as volatile liquids and explosive vapors.

Some of the prior structures undertake to use the interior flexible bag as a container for the fluid to be stored. This expedient has serious defects, among them being excessive wear of the flexible container when such a flexible container is shifted about partially full. Others of the prior patents show somewhat complex structures unsuited, by reasons both of performance and cost, to use on a conventional tank for the well-known combustion engine.

For preventing the hot-soak evaporative emissions from exposure to and pollution of the atmosphere when the engine is shut off and latent heat therefrom is causing vaporization of the fuel in the carburetor itself, a power controlled butterfly, throttle, or other suitable valve located upstream of the aforementioned tube is biased to closed position thereby causing the hot-soak vapors to enter said tube and be conducted through it back to the fuel tank where cooler liquid will absorb said vapors by condensation or affinity. In the event that equilibrium already exists, the vapors will temporarily displace a proportional volume of air from the flexible bag until such time as the engine is again started and the pressure drop so occasioned will purge the tank of all existing vapors. The valve may be controlled by other suitable means such as a pendalum or spring.

There is presently available in the art pertaining to suppression of diurnal breathing evaporative emission losses, running evaporative emission losses, and hot-soak evaporative emission losses, a number of both dependent and independent control devices in sundry combinations. The vast majority of these devices depend upon conducting such vapors in one manner or another to an activated charcoal container where, theoretically at least, they are supposed to be absorbed by said activated charcoal and then, ultimately, purged from the charcoal by the running engine. Such expedients are actually defective. For example, hot-soak vapors when generated thermally by latent heats in the engine compartment and exhaust manifold, temperature of fuel in the carburetor is often as high as 300°F. Heavy ends therefrom will remain in the activated charcoal until considerably higher temperatures are applied during the purging cycle. Many such hot-soak cycles eventually render the container saturated.

When the fuel tank is filled to capacity with cool fuel, usually from subterranean storage, and the vehicle is driven a short distance to a parking lot where it resides in the sun all day the fuel is subject to thermal expansion. Liquid then completely fills the charcoal container. The container is then rendered ineffective for an indefinite period of time and never regains full effectiveness until the charcoal is reactivated.

In the matter of diurnal breathing losses, thermal and kinetic vaporization introduces appreciable heavy end vapor constituents into the activated charcoal which normal vehicle operation cannot purge.

Running losses from the fuel tank exist under the same situation when diurnal breathing losses are encountered plus the added factor of motion-induced splashing.

It is therefore among the objects of this invention to provide a new and improved means of inexpensively retrofitting all motor vehicles other than closed-system gaseous fueled units with a simple and positive means of precluding exposure of fuel or its vapors to the surrounding atmosphere.

Another object of the invention is to provide a new and improved means for the self-accommodation of noxious and photochemically reactive vapors heretofore emitted by motor vehicles.

Still another object of the invention is to provide a simple and relatively inexpensive means for self-accommodation of noxious and photochemically reactive vapors rather than to attempt neutralization of such vapors by means of costly reactivation or replacement of neutralizing agents.

Further among the objects of the invention is to provide a new and economical means for conserving the fuel energy in vapor form which heretofor in the process of ineffectual neutralization has been lost to the consumer.

An additional object of this invention is to provide a new simple and positive means of substantially eliminating hot-soak evaporative losses.

Further, it is an object of the invention to provide, through self-accommodation of hot-soak vapors in the fuel tank by displacement of the air in the bag, a momentary enrichment by said vapors of the starting air and fuel mixture which is critically lean in newer vehicles due to those exhaust emission control devices which have already created starting problems.

Still further among the objects of the invention is to provide a new, simple and inexpensive means of substantially eliminating diurnal breathing losses from the fuel tank and other parts of the fuel system when the fuel tank is subjected to a temperature increase representative of the diurnal range.

Still another object of the invention is to provide a new and effective means of substantially eliminating running evaporative emissions from the fuel tank and carburetor.

It is a further and important object of this invention to provide an entirely new, positive, relatively inexpensive interrelated, and energy-conserving system whereby the known volumes and tonnages of noxious and wasteful hydrocarbon emissions from evaporative, spillage, outage, and fuel transfer losses can be reduced to such a points as to render hydrocarbon evaporative emissions virtually unnoticeable.

With these and other objects in view, the invention consists of the construction, arrangement, and combination of the various parts of the device, whereby the objects contemplated are attained, as hereinafter set forth, pointed out in the appended claims and illustrated in the accompanying drawings.

In the drawings:

FIG. 1 is a perspective view of a typical flexible bag of the kind usable in the assembly.

FIG. 2 is a side elevational view partially broken away showing the flexible bag in place when the tank is empty.

FIG. 3 is a fragmentary sectional view similar to FIG. 2 showing the position of the parts when the tank is substantially full.

FIG. 4 is a fragmentary longitudinal sectional view on the line 4 — 4 of FIG. 3.

FIG. 5 is a side elevational view partially broken away showing a second form of the invention.

FIG. 6 is a transverse sectional view partially broken away showing the form of the invention in which the hot-soak eliminator is installed as part of a closed circuit relief.

FIG. 7 is a longitudinal sectional view of a nozzle provided with a muff and trigger shut off.

FIG. 8 is a side perspective view of the muff of FIG. 7.

FIG. 9 is a fragmentary sectional view of the muff engaging a full pipe.

FIG. 10 is a side elevational view partially in section showing a modified form of nozzle in a fill pipe.

The invention incorporates a highly flexible bag or container 10, or multiplicity of bags or containers, fabricated to substantially the internal dimensions (clearances and tolerances being peculiar to each size and shape of vessel) of a liquid storage tank or vessel 11, either stationary or mobile, having one or more openings the peripheral edges of the openings being hermetically sealed to the body of a fluid level controlling breather valve (FIG. 1). For purposes of simplicity, discussion hereafter will consider one bag and one valve per bag, the consideration of a multiplicity of bags and valves being to accommodate shapes and sizes of vessels precluding the feasibility of one bag. The fluid level controlling valve allows air to enter or be expressed from the bag as the liquid level in the vessel changes.

The flexible bag or container 10 may be fabricated of a suitable inert, tough, highly flexible material of satisfactory degree of elongation and resistance to permeability of vapors to which it may be exposed. When inserted in the vessel and inflated, the bag is sized to substantially occupy the entire chamber within the tank.

In one embodiment of the invention chosen for the purpose of illustration the tank 11 is shown as having a top wall 12, a bottom wall 13, and side walls 14. When the bag 10 is of indeterminate form, as illustrated in FIG. 1, the area of the bag should be of such size that, when inserted in the tank 11 and inflated as shown in FIG. 2 the bag will provide a top wall 15, a bottom wall 16 and side walls 17, and will substantially fill the interior of the chamber identified by the reference character 18. Moreover, when inflated the bag provides, on its interior, an air space 19 only slightly smaller than the volume of the chamber 18 within the tank.

In the top wall 12 of the tank, as shown in FIGS. 1, 2, and 3, there is an opening 20 in which is located a breather valve assembly 21. In the embodiment shown there is a flange 22 on the breather valve assembly applied over a washer 23, and secured by means of screws 24. The opening 20 may be the opening already present in the tank where the float control mechanism is located.

A collar 25 surrounding an appropriate opening 26 in the breather valve is provided with a sealing ring 27 adapted to be clamped by the washer 23 when the breather valve assembly 21 is fastened in place, thereby to seal the opening 20 in the top of the tank.

Within the breather valve assembly 21 there are spiders 28, 28' centrally mounting a sleeve 29 in which reciprocates a stem 30 of a breather valve element 31, the breather valve element 31 being adapted to seat upon a breather valve seat 32. Expansion bleed holes 33 prevent the valve element 31 from completely sealing off the interior space within the bag. A split ring stop 34 at the top of the stem 30 prevents the stem from falling downwardly beyond a limited position.

Near the top of the tank 11 is a fill pipe 35, there being provided a conventional feed port 36 supplying a fuel line 37 to an appropriate combustion engine. A wear pad 38 forming part of the bottom wall 16 of the bag 10, in vertical alignment with the valve element 31 has a convex lower surface 39 so as to provide a slight protuberance engageable with the inside surface of the bottom wall 13 of the tank, as shown in FIG. 2, so as to inhibit the forming of a sealed pocket whereby to prohibit inadvertent trapping of vapors. Engagement of the wear pad 38 with the valve element 31 throughout the operating life of the bag serves to prevent wear and puncturing of the bag wall itself.

In the operation the breather valve assembly 21 is attached to the collar 25 of the bag and the bag collapsed and inserted through the opening 20 in the top wall 12 of the tank. The flange 22 of the breather valve assembly is then fastened to the top wall 12 through the washer 23, thereby to effectively seal the sealing ring 27 in an annular recess 27' and around the edge of the opening 20. The area of the bag 10 is sufficiently great and the material is sufficiently flexible so that when the bag is within the chamber 18, it will expand into engagement with the walls of the chamber. If need be, the bag may be artificially inflated the first time in order to press it effectively against the chamber walls as shown in FIG. 2.

Thereafter when the tank is to be filled, a pressure responsive automatic nozzle 43 preferably of the type shown in FIGS. 6 – 10 is applied to the fill pipe 35 in the usual fashion. The nozzle 43 includes a resilient muff 44. In order to prevent any vapors from passing outwardly from the fill pipe 35 around the nozzle, it is preferable to equip the nozzle with a sealing muff indicated generally by the character 44 (FIGS. 8 – 10) adapted to engage and seal itself around the edge of the fill pipe. As volatile liquid fuel is passed into the chamber 18 in this fashion, the liquid fuel will press upwardly against the bottom wall 16 of the bag 10 callapsing the bag and expelling air from the interior space within the bag outwardly past the valve seat 32 and breather valve passage 40 into the surrounding atmosphere.

Since only air from the surrounding atmosphere was initially present in the bag, only air will be expelled and no vapors from the tank otherwise can pass to the atmosphere. Filling can continue until the wear pad 38 engages the valve element 31, thereby to press the valve element against the valve seat 32 and effectively shut off the air passage 40, except for a limited access thereto through the expansion bleed holes 33. Use of the bleed holes allows air to be exhausted from the bag subsequently as liquid in the tank may expand as a result of thermal rise.

A relief pipe 42 (FIGS. 2 and 3) is shown temporarily closed with a plug 41. That part of the system directed to control of hot-soak evaporative emissions shown in FIG. 6 as adapted to be attached to the pipe 42.

As fuel is drawn from the full fuel tank 11 through the feed port 36 and the fuel line 37, for example, to operate an appropriate combustion engine, the level of fuel in the tank 11 gradually lowers. As it lowers, the wear pad 38 moves downwardly permitting the valve element 31 to disengage from the valve seat 32 and air from the surrounding atmosphere will progressively fill the interior of the flexible bag 10 to replace liquid fuel taken from the tank during use.

On those occasions where the principle of construction can be built into a new fuel tank 50, a structure such as that illustrated in FIG. 5 may be employed. In this instance an upper portion 51 of the fuel tank 50 is provided with a perimetrical flange 52 which is complementary to and matches a perimetrical flange 53 on a lower portion 54 of the tank 50. In this arrangement, a flexible diaphragm 56 is provided with a perimetrical flange 57 adapted to be clamped between the flanges 52 and 53 when the tank is initially assembled. The surface area of the diaphragm 56 is made sufficiently great so that when the tank is empty as pictured in FIG. 5, the diaphragm will assume the solid line position there shown contacting bottom and side walls of the tank. Conversely, when the tank is filled, the diaphragm will elevate to the broken line position 56', in which position a wear pad 58 will contact the breather valve assembly 21 in the same manner as previously described.

Inasmuch as the system herein above described is essentially a closed system the relief also is a closed system. In the embodiment of the invention shown in FIG. 6, there is provided a relief line 60 extending from the relief pipe 42 in which is a T 61, one leg of which is connected to a conventional spring loaded low pressure ball check valve 62, the relief line 63 wherefrom leading to the engine crank case. In the alternative it may be passed to the air supply for the combustion engine.

In the form of the device illustrated in FIG. 6 the other leg of the T is connected by a line 64 to a fuel-air intake pipe 65 of the combustion engine.

The fuel intake pipe 65 of FIG. 6 feeds a conventional intake manifold 69. A collar 70 on the intake pipe 65 has a passage 71 therethrough in which a butterfly valve element 72 is mounted on a pivot 73. The valve element 72 has a circumferentially mounted seal ring 74. The line 64 previously described has its outlet opening 75 located more or less centrally of the passage 71 and down-stream of the valve element 72.

To operate the valve element 72 an arm 76 on the valve element has a pivot connection 77 to a plunger 78 of a solenoid 79. A bracket 80 holds the solenoid 79 in position on the collar 70.

The parts described can readily retrofit most conventional combustion engine fuel systems.

It is also of some moment to note that the axis of the passage 71 is in the direction of air flow and produces a pressure drop equivalent to $0.8q$ (dynamic impact pressure) maximum $q$ at the center line or axis of the air column. Accordingly, operation of the solenoid when the engine stops to close the valve element 72 will cause return of what are commonly called hot-soak vapors to the fuel tank to be condensed by the cooler reservoir of liquid fuel instead of escaping to polute the atmosphere.

As a further safeguard an O ring valve seat 85 is provided at the pipe 42. Operating against the valve seat 85 is a reinforced preformed concave disc 86 in the bag 10 acting as a valve element. The valve thus provided serves as a flapper valve when the bag 10 is fully inflated to ambient pressure. The parts described provide for a static vent to the crank case for lubricating oil absorption and prevent an excessive dynamic pressure drop from collapsing the tank under circumstances where the valve 72 may malfunction.

From the foregoing description it will be apparent that virtually any fuel systems already in existence can readily be supplied with the bag structure by the mere expedient of making use of an opening of suitable size in the top or appropriate wall structure of the tank, the size merely being big enough so that the flexible bag can be passed into the tank, inasmuch as other structure incorporated in the breather valve assembly is located on the exterior of the tank. Conventional sheet metal tanks can be readily provided with such an appropriate opening without need for removal from the vehicle itself.

Details of a nozzle 43 and muff 44 of resilient character previously made reference to are shown in FIGS. 7, 8, 9, and 10. As there shown, the fill pipe 35 is provided with a customary gas cap lock flange 90 which provides access to a passage 91. A spout 92 projecting from a body 93 of the nozzle is adapted to inject liquid fuel into the passage 91 of the fill pipe 35. The muff 44 is of hollow construction also provided with a collar 94 surrounding the base of the spout 92, the collar being of diameter large enough to overlie the entire rim of the gas cap lock flange 90. An inner sleeve 95 extending from the collar snuggly surrounds the spout 92 in sealed relationship. An outer sleeve 96 is somewhat frusto-concial in shape and is spaced from the inner sleeve 95. The outer sleeve 96 is provided with a hollow bead 97 of diameter large enough to seal against the wall of the passage 91 and to releasably lock beneath the gas cap lock flange in the manner shown in FIG. 7. When applied as there shown, the entrance of the fill pipe 35 is completely sealed during the filling operation thereby confining all volatile gases which may be generated during a filling operation to the fuel tank. When such a muff construction is employed on the nozzle, it becomes a component part of a system for the control of fuel tank vapors, in combination with the bag accessory for the tank hereinabove described.

To accommodate fill pipes 35 of varying sizes the spout 92' as shown in FIG. 10 may be provided with an additional bead 97' of different circumferential size, in case a fill pipe 35', for example, may be smaller. Additional beads like the bead 97' may be employed.

Since the fill pipe 91 is sealed by action of one or another of the beads 97, 97' the resilient muff 44 may be provided with a flexible dimple 100 in operative engagement with a trigger 101. When the tank 11 is sealed by pushing the muff into place pressure created inside the muff extends the dimple 100 and shifts the trigger 101 to a position to effect release of the flow valve trigger existent in conventional dispensing nozzles (not shown) to start the flow of fuel into the tank. By this device filling can not commence until the fill pipe has been sealed thereby to assure that no vapors can escape into the atmosphere.

Having described the invention, what is claimed as new in support of Letters Patent is:

1. A fuel tank system for storing and dispensing a volatile fluid to a combustion engine having a conventional ignition circuit, crank case and air intake passageway to an intake manifold provided with a shut-off valve, said system comprising a tank having a top, bottom, and side walls forming a closed chamber, fill pipe and discharge means for said chamber located on said tank, a flexible bag when in operative position having a top, bottom, and side wall structure corresponding generally to the top, bottom, and side walls of the tank on the inside thereof, an opening through one of the walls of the tank separate from said fill pipe, an opening in said bag coincident with the opening in the tank, a collar around the opening in the bag comprising a seal between the respective tank wall and the bag, and a breather valve operatively associated with said openings for passing air between the interior of said bag and the exterior of the tank when volatile fluid is respectively filling and emptying said tank, said breather valve assembly comprising a body having a passage therethrough, a breather valve seat for said passage, a valve element operably associated with said valve seat and constantly open bleed passage means between the passage and the interior of the bag bypassing said valve seat, and means responsive to the level of liquid in the tank adapted to close the valve element on the valve seat when the liquid level reaches a pre-set elevation, a vapor auxiliary line having an inlet at the tank in communication with said chamber exterior of said bag and an outlet in a portion of the air intake passageway at a location downstream of said shut-off valve, said auxiliary line being clear between said inlet and said outlet, and an automatic valve actuator in operative engagement with said shut-off valve set for operation in a direction closing said valve when engine operation is discontinued and leaving the vapor auxiliary line open between the tank and said portion of the air intake passageway.

2. A fuel tank system as in claim 1 wherein the outlet of the auxiliary line faces in a direction transverse to the direction of flow of air in said air intake passageway.

3. A fuel tank system as in claim 1 wherein the shut-off valve is a butterfly valve and the valve actuator is a solenoid interconnected with said engine ignition circuit.

4. A fuel tank system as in claim 1 wherein the actuator is an offset shaft spring loaded so as to open said valve when engine air demand occurs upon starting of said engine and close said valve when engine air demand ceases upon shutting off said engine.

5. A fuel tank system as in claim 1 wherein there is a valve seat at the inlet to said auxiliary line and a valve element responsive to excessively high pressure drops potentially generated at the opening of the vapor auxiliary line due to malfunction of said shut-off valve.

6. A fuel tank system as in claim 1 wherein there is a branch line connected between said auxiliary line and the engine crank case and an outwardly opening check valve in said branch line.

7. A fuel tank system as in claim 1 including an opening at the top of the tank in communication with said auxiliary line, a valve seat around said opening, and a valve element on said flexible bag responsive to excessively high pressure drops generated in said vapor auxiliary line due to malfunction of said shut-off valve.

* * * * *